United States Patent [19]

Heinze et al.

[11] 4,128,921
[45] Dec. 12, 1978

[54] TENSION STRAP WITH MOVABLE TENSION BLOCKS

[75] Inventors: Horst Heinze, Krailling; Günter Stierle, Unterhaching; Ernst D. Sach, Garching, all of Germany

[73] Assignee: Messerschmitt-Bölkow-Blohm Gesellschaft mit beschrankter Haftung, Munich, Germany

[21] Appl. No.: 856,976

[22] Filed: Dec. 2, 1977

[30] Foreign Application Priority Data

Dec. 9, 1976 [DE] Fed. Rep. of Germany ....... 2655772

[51] Int. Cl.² .............................................. F16L 33/04
[52] U.S. Cl. .......................................... 24/279; 24/19; 24/262; 285/408
[58] Field of Search .................... 24/285, 279, 262, 19, 24/249 LS; 285/408; 248/74 B

[56] References Cited

U.S. PATENT DOCUMENTS

| 1,568,043 | 1/1926 | Anderson | 24/279 |
| 2,842,385 | 7/1958 | Webster | 285/367 |

Primary Examiner—Bernard A. Gelak
Attorney, Agent, or Firm—Toren, McGeady an Stanger

[57] ABSTRACT

A tension strap to be circumferentially positioned about a body to be tensioned includes a strap member and a plurality of longitudinally movable tension blocks carried on the inside circumferential surface of the strap member for engaging the body. Means for maintaining each of the tension blocks in a defined predetermined position relative to the strap member is provided and includes at least one pin fixedly carried by either the tension block or the strap member and extending through a guideway in the other, and an elastic member such as a spring or elastomer acting on the pin of each tension block against longitudinal movement to predetermine its position relative to the strap member.

10 Claims, 4 Drawing Figures

TENSION STRAP WITH MOVABLE TENSION BLOCKS

BACKGROUND OF THE INVENTION

The present invention relates generally to tension straps for surrounding and tensioning a body, and more particularly to a tension strap having movable tension blocks.

Tension straps operate on the basis of creating a bearing pressure against the body to be tensioned. This bearing pressure is caused by reducing the circumference of the tension strap about the body being tensioned, in other words, tightening the strap on the body. As a result, a positive connecting force develops between the tension strap and the body being tensioned by the strap.

Because of the friction engagement between the tension block and the body being tensioned, as a result of the tight fit of the strap around the body, and the expansion of the tension strap which occurs during the tightening of the strap, the means for fastening the tension block with the strap or the tension strap itself may be damaged. Therefore, previously known tension straps having movable tension blocks have a substantial amount of clearance between the tension block and the tension strap on which they are carried. However, the provision of such clearance requires that the tension blocks be separately and manually positioned before mounting the tension strap so that the expected expansion in the strap which occurs during tightening the strap can be tolerated. A further disadvantage of this arrangement is that it becomes necessary to constantly reposition the tension blocks during the tightening of the tension strap by tapping on the blocks so as to release it from its original position.

It is accordingly the principle object of the present invention to provide a tension strap having movable tension blocks carried thereon in such a manner as to avoid the necessity of manually positioning the tension blocks when placing the tension strap on the body to be tensioned, and which avoids the necessity of releasing or repositioning the tension blocks while tightening the strap.

Other objects, features and advantages of the invention will become apparent from the description of the invention in connection with the drawings to be described more fully hereinafter.

SUMMARY OF THE INVENTION

The principle object of the present invention is generally accomplished by providing that the tension blocks are carried for longitudinal movement on the strap in such a manner as to maintain each tension block in a defined position relative to the strap. This is accomplished by providing at least one pin fixedly carried in either each tension block or in the strap for each block. The pin is arranged to radially extend through a longitudinal guideway in either the block or the strap to which the pin is not fixed, and an elastic member carried on the strap so as to act on the pin of each tension block. In one embodiment of the invention, two pins are associated with each block. One of the pins is fixedly carried in the block and extends through a longitudinal guideway in the strap, while the other pin is fixedly carried in the strap and extends through a guideway in the block. The elastic member is formed by a spring suspended between the two pins. In another embodiment only a single pin is fixedly carried by each block and extends through a single guideway in the strap. The elastic means acting on this pin can take the form of either an elastomer carried within a housing surrounding the pin, or a pair of springs carried within a housing on the outside of the strap.

The advantage of the foregoing structure is that the tension blocks of the present invention are capable of being moved into a predetermined position with respect to the strap even while the strap is being tightened. In addition, the present invention permits the friction forces which develop between the tension blocks and the body being tensioned during the tightening or tensioning process to be substantially reduced and transmitted to the interface between the tension strap and the tension blocks.

Various embodiments of the invention will be more fully described with reference to the following drawings annexed hereto.

DESCRIPTION OF THE INVENTION

Figures 1, 1A:
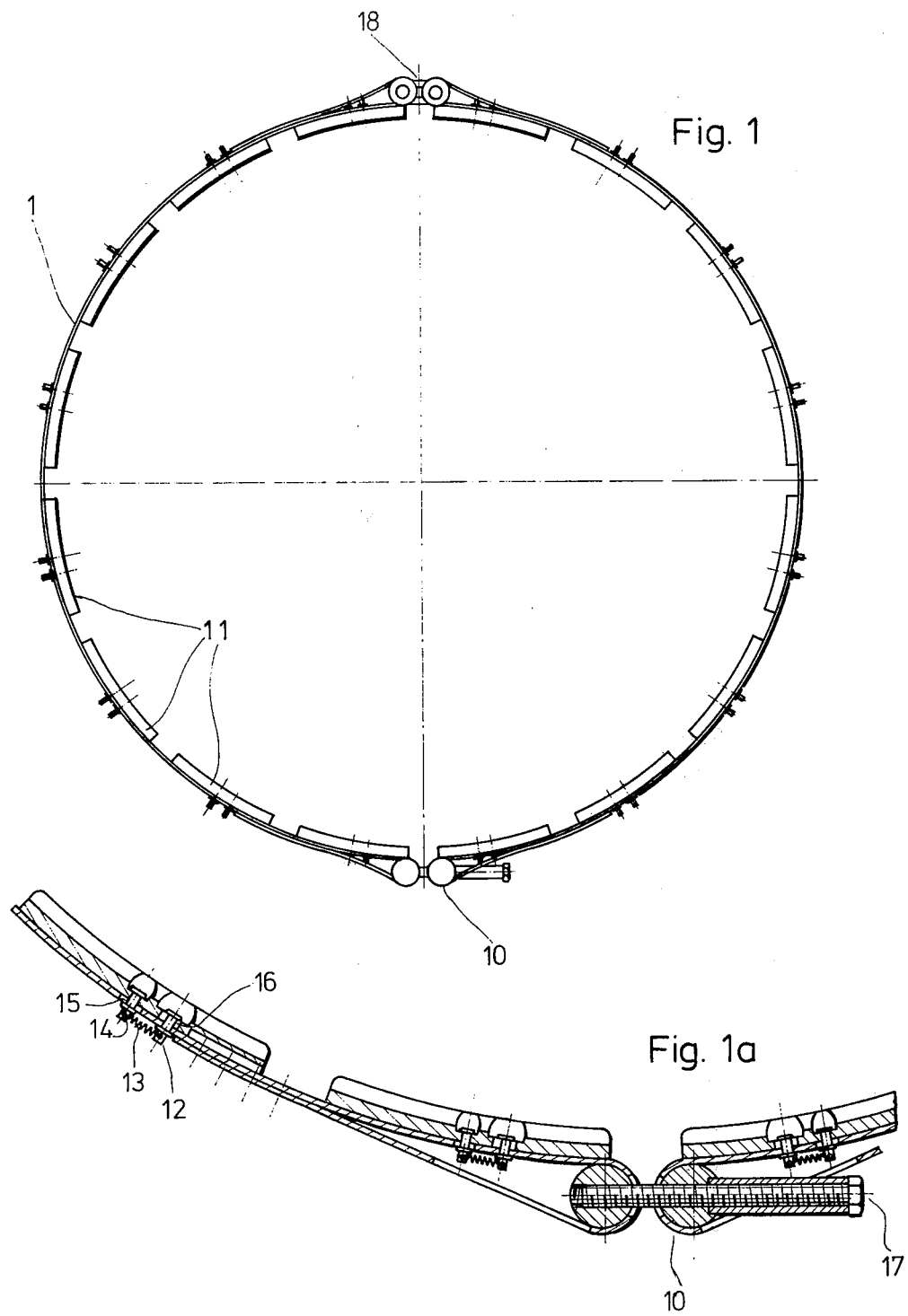
FIGS. 1 and 1a illustrate the arrangement of the tension blocks carried on the strap member of the tension strap in plan view and enlarged partial plan view respectively.

Referring now to FIGS. 1 and 1a, the tension strap of the present invention is shown as including a strap member 1, a double joint 18, a tightening coupling arrangement 10 and a plurality of tension blocks 11 carried on the inside circumferential surface of the strap member 1.

As appreciated more fully from FIG. 1a, the tension blocks 11 are connected to and carried on the strap member 1 by an arrangement of a guide pin 12, a tension pin 14 and a tension spring 13 carried between the guide pin 12 and the tension pin 14. The tension pin 14 is securely fit in the tension block 11 and radially extends through a longitudinal guide way 15 in the strap member 1. The pin 14 is securely and fixedly carried in the block 11 with no clearance around it.

Guide pin 12 is carried in the strap member 1 in a fixed and secure manner and extends radially inward through a longitudinal guideway 16 in the tension block 11. Tension spring 13 is connected between the ends of the pins 14 and 12 which project on the outside of the strap member 1. A sufficient opening is provided in the blocks 11 to allow easy insertion of the pins 12 and 14.

Fixedly positioning pin 14 in the block passing through a clearance guideway in the strap and fixedly positioning pin 12 in the strap passing through a clearance guideway in the block to permit movement of the pins in a longitudinal direction results in predetermined positioning of the blocks with respect to the strap member, even before the tension strap is positioned over a body to be tensioned. The tension spring 13 acts between the pins 12 and 14 and hence between the strap and tension block respectively to define the position of each block with respect to the strap member. Manual positioning of the tension blocks is therefore not necessary.

When the tension strap is placed over and around a body to be tensioned, and is tightened around that body through the use of a tightening mechanism such as a tension screw 17 acting on the coupling arrangement 10, the tension blocks 11 will be moved relative to the body being tensioned. Additionally, the strap member 1 will be longitudinally moved with respect to the plurality of blocks 11 but only to the extent determined by the length of the longitudinal guideways. In this manner, the friction forces developing between the blocks 11 and the body being tensioned can be transposed to the interface between the blocks 11 and the strap member 1. Thus, the bearing pressure on the body being tensioned will be maintained. Damage to either the tension strap or to the body being tensioned is therefore avoided.

Figure 2:
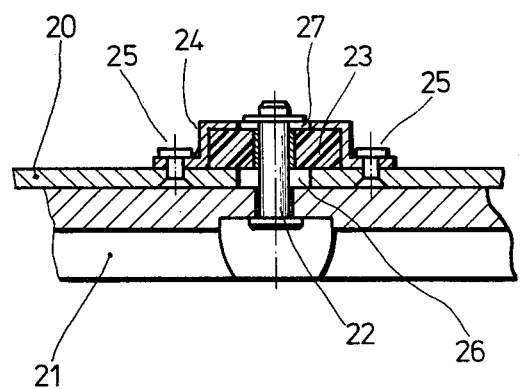
FIG. 2 is a partial sectional view illustrating the elastic means acting on the pin of the tension block according to one embodiment of the invention.

FIG. 2 illustrates an embodiment of the invention for supporting the tension blocks on the strap member using only a single pin. In this embodiment only one longitudinal guideway 26 is provided. Longitudinal guideway 26 is arranged in the strap member 20 while the pin 22 is fixedly carried in the tension block 21. Again it can be noticed that a sufficient opening is provided in the block for insertion of the pin. A housing 24 is mounted on the outside of the strap member 20 by means of rivets 25. Elastic material such as an elastomer 23 is carried within the housing 24 and surrounds the pin 22 which radially extends through the guideway 26. A reamed bore 27 is provided in the top of the housing 24 to provide an opening for passage of the pin 22. The reamed bore 27 will provide sufficient clearance around the pin 22 so as to permit the same degree of movement as provided by the guideway 26.

When using an elastomer instead of a spring element for determining the position of the block with respect to the tension strap, it is possible to form the guideway 26 in the shape of a circle rather than in the shape of a longitudinal slot. When using a circular guideway the tension block is movable in all directions within a single plane rather than in only a longitudinal direction. This arrangement provides additional advantages when the tension strap is used to brace together less precisely finished parts.

Figure 3:
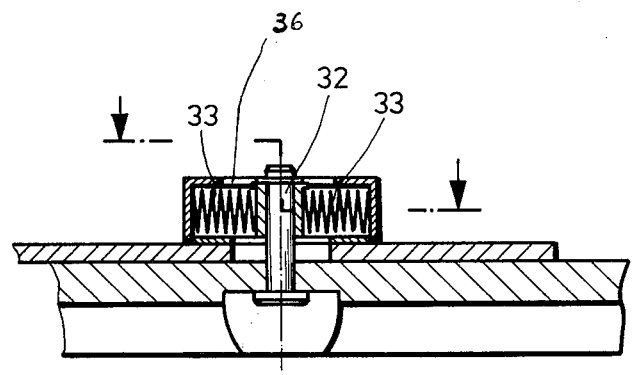
FIG. 3 is a view similar to that of FIG. 2 illustrating another type of elastic means.

In FIG. 3, a pair of springs 33 are provided as the elastic member instead of the elastomer as shown in FIG. 2. In this embodiment a pin 32 is similarly fixedly carried in the tension block radially passing through a longitudinal guideway in the strap member and through an opening 36 in a housing mounted on the strap member which carries the springs 33. Springs 33 therefore act on the pin 32 so as to centrally position it within the longitudinal guideway to thus define the position of the block with respect to the strap. Springs 33 can either be spiral springs, flat springs or other similar springs which can perform the same function of acting on the pin. The use of springs such as shown in FIG. 3 may be more desirable than an elastomer which may not provide sufficient forces against the pin in certain circumstances or which may tend to lose their elasticity and therefore not be able to perform the intended purposes. This may occur when the tension strap is used in situations involving extreme temperatures or extreme temperature changes such as may occur when used on space vehicles.

In both the embodiments shown in FIGS. 2 and 3, a sleeve may be provided around the pin 22 or 32 which extends through the housing so that the elastic material 23 or 33 does not act directly on the pin but rather through a sleeve.

In each of the embodiments of the present invention it may additionally be advisable to apply a teflon coating to the surfaces of the tension strap or the tension blocks which face each other or to the surfaces of both the strap and the block. In this manner, friction between the tension strap and the tension block will be substantially reduced.

While the present invention has been described and illustrated with respect to certain perferred embodiments which produce satisfactory results, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A tension strap comprising a strap member to be circumferentially positioned about a body to be tensioned, a plurality of longitudinally movable tension blocks carried on the inside circumferential surface of said strap member for engaging said body, and means for maintaining each said tension block in a predetermined position relative to said strap member, said means including at least a first pin extending through each said tension block and said strap member, said pin being fixedly carried in either said tension block or said strap member and passing through a guideway in the other, and elastic means acting on said pin against longitudinal movement thereof to predetermine the position of said tension block with respect to said strap member.

2. The tension strap according to claim 1 wherein said first pin is fixedly carried in said tension block, said guideway being in said strap member, and further comprising a second pin for each tension block fixedly carried in said strap member and extending through a longitudinal guideway in each of said tension blocks, and wherein said elastic means comprises a tension spring connected between said first and second pins.

3. The tension strap according to claim 1 wherein said pin is fixedly carried in said tension block and wherein said guideway is in said strap member.

4. The tension strap according to claim 3 wherein said guideway is circular being formed by reamed bores.

5. The tension strap according to claim 1 wherein said elastic means comprises a pair of springs each acting on opposite sides of said pin.

6. The tension strap according to claim 5 wherein said springs are spiral springs.

7. The tension strap according to claim 5 wherein said springs are flat springs.

8. The tension strap according to claim 1 wherein the surfaces of said tension blocks which face the tension strap are coated with teflon.

9. The tension strap according to claim 1 wherein the surface of the tension strap which faces the tension blocks is teflon coated.

10. The tension strap according to claim 1 wherein the surfaces of the tension blocks which face the tension strap and the surfaces of the tension strap which face the tension blocks are teflon coated.

* * * * *